United States Patent [19]

Williams et al.

[11] 4,038,063
[45] July 26, 1977

[54] METHOD AND APPARATUS FOR MAKING CONTINUOUS FOAM GLASS PRODUCT

[75] Inventors: Tudor Williams, Studio City; John D. Bost, Culver City, both of Calif.

[73] Assignee: E. C. P., Inc., El Segundo, Calif.

[21] Appl. No.: 641,810

[22] Filed: Dec. 17, 1975

[51] Int. Cl.² .............................................. C03B 19/08
[52] U.S. Cl. ........................................... 65/22; 65/18; 65/88; 65/89; 65/144; 65/145; 65/192; 264/45.8; 264/122; 425/817 C; 425/DIG. 108
[58] Field of Search .................... 65/18, 22, 88, 87, 89, 65/144, 145, 192; 264/56, 45.8, 46.2, 49, 110, 122; 425/817, DIG. 108; 106/40 V

[56] References Cited

U.S. PATENT DOCUMENTS

| 2,257,681 | 9/1941 | Haux ........................ 65/144 |
| 2,322,581 | 6/1943 | Lytle ........................ 65/22 X |
| 3,441,396 | 4/1969 | D'Eustachio et al. ........ 106/40 V X |
| 3,473,904 | 10/1969 | Kraemer et al. ............ 65/144 X |
| 3,767,373 | 10/1973 | Velev ........................ 65/144 |

FOREIGN PATENT DOCUMENTS

| 4,011,947 | 1965 | Japan ........................ 65/87 |

*Primary Examiner*—Robert L. Lindsay, Jr.
*Attorney, Agent, or Firm*—Nilsson, Robbins, Dalgarn & Berliner

[57] ABSTRACT

A continuous process for the manufacture of cellular ceramic product. Ceramic feed material is transported successively through a preheat kiln section, through a foaming section whereat foaming agent mixed with the ceramic feed material is activated, and into a drawing kiln section. An elongate hollow product can be formed by drawing the foamed ceramic while soft around and past a hollow mandrel to form an elongate hollow cylindrical member.

12 Claims, 5 Drawing Figures

U.S. Patent   July 26, 1977   Sheet 1 of 2   4,038,063
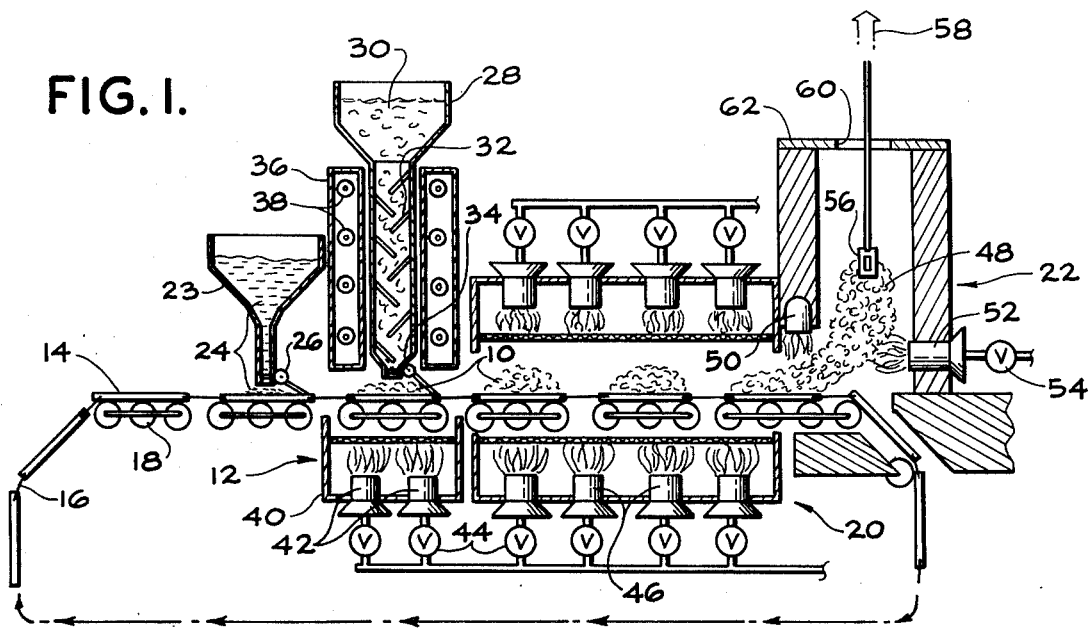
FIG. 1.
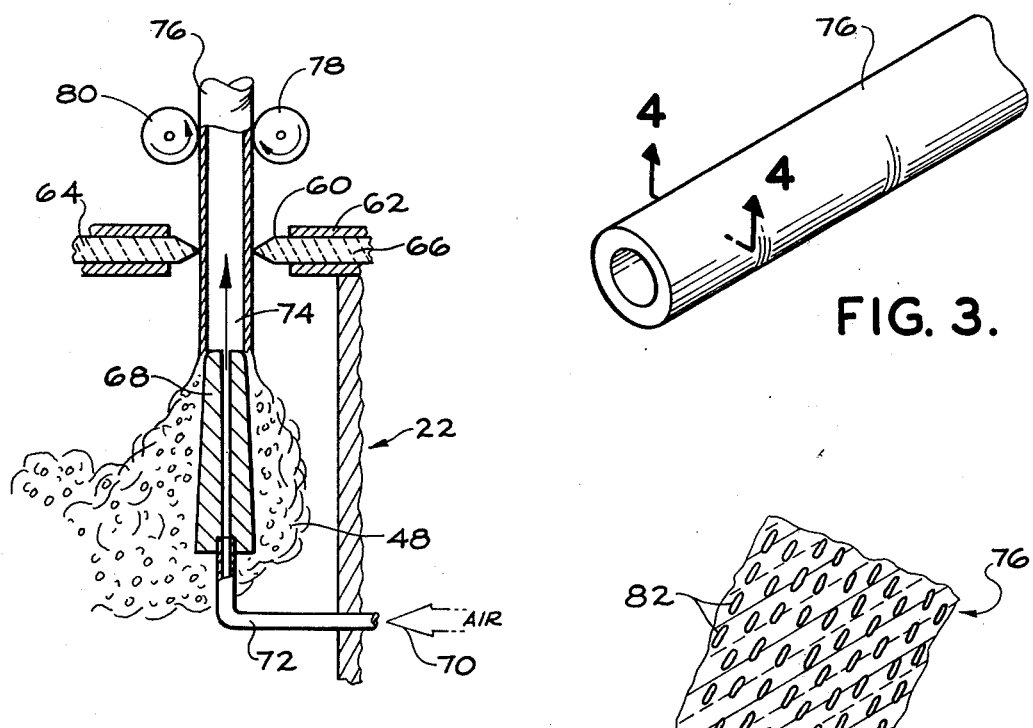
FIG. 2.
FIG. 3.
FIG. 4.

METHOD AND APPARATUS FOR MAKING CONTINUOUS FOAM GLASS PRODUCT

FIELD OF THE INVENTION

The present invention relates to the field of glass, more particularly the manufacture of foamed glass.

BACKGROUND AND SUMMARY OF THE INVENTION

An object of the present invention is to provide a process whereby a cellular ceramic product, which can be referred to simply as "foamed glass", is produced in a continuous and economical manner in the form of elongate members, more particularly in the form of hollow elongate cylinders. In such form, the foamed glass product can be used as a structural member in a number of industries including the housing industry as a bearing member, in processing industries as conduit, as sewer pipe, and, in a particular exemplification, as a telephone pole or power line to replace wood poles. Particularly in the last utility, it will be appreciated that increasing demand for wood by numerous industries has caused shortages in the supply of wooden poles. Because of the inherent properties of the wood selected for such poles, they are excellent support members for high tension power lines and power poles have been constructed varying in length from 25 feet to almost 100 feet and formed to bear horizontal loads ranging in weight from below 400 lbs. to in excess of 11,000 lbs. However, material shortages and the competing demands for wood make it desirable to provide a substitute material. Such a material should be readily available, easily formed in lengths up to 100 feet, be able to withstand a stress of 5,000–8,000 psi, be economical in comparison with the purchase cost and life cycle cost of wood, be attractive or be capable of being made attractive, be fireproof and be a good electrical insulator.

The present invention provides such a material in the form of foamed glass produced by a continuous process which enables a pole structure to be directly obtained. In this general form, any glass composition can be used with appropriate foaming agents. In preferred embodiments, further economies are obtained by utilizing fly ash as a glass base or as a filler. Fly ash (calcium alumino-silicate, containing iron) is generated from coal and usually considered a waste material so that its utilization provides an extremely economical product.

More specifically, a continuous process is provided for the manufacture of cellular ceramic product in which a foaming agent is added to a ceramic feed, the foaming agent requiring a temperature in excess of 500° C for activation. The process comprises transporting ceramic feed through a first kiln section and preheating it at a temperature of at least 500° C, but lower than the foaming agent activation temperature. Thereafter, the ceramic feed is transported into a second kiln section and a mixture thereof with the foaming agent is heated to the activation temperature for a time sufficient to form the foamed ceramic. The foamed ceramic is then transported while it is at or above its softening point to a drawing kiln section from which it is gathered and formed into product. The process is continuous so that while a first amount of the ceramic feed is fed through the kiln sections it is followed by a second amount either as a separate batch or continuously in a stream. In the first case, the ceramic feed mixture is initially deposited in powder form on refractory plates which are conveyed through the kiln sections, and the process can be referred to as a "powder process". In the second case, the ceramic material and foaming agent are heated to melt together in a tank, and the process can be referred to as a "tank process". The powder process is particularly useful where it is desired to add the foaming agent directly to the ceramic feed whereas a tank process is particularly suitable for adding the foaming agent to the feed after preheating, i.e., after passage of the ceramic feed to the first kiln section. Additionally, as a result of thermal balances, the powder process is most suitable for the use of fly ash as a filler and a ceramic feed can be used containing about 1–30% by weight of fly ash. The tank process is particularly suitable for use of fly ash as the major component.

The product obtained is formed as an elongate member having a length of at least 10 feet and a width dimension of about 3–36 inches. Preferably, the elongate member is in hollow tubular form and is obtained by drawing the foamed ceramic, while soft, around and past a hollow mandrel while air is passed through the mandrel. Specifically, with a preheat temperature of about 500°–750° C and an activation temperature of about 800°–1200° C, a foamed ceramic product is formed having a cellular structure of closed, elongate bubbles in which the bubbles have a diameter in the range of about 0.01 mm to about 1 cm and a length in the range of about 2 mm to about 5 cm, the volume of said bubbles constituting about 10% to about 90% of the volume of the foamed ceramic.

BRIEF DESCRIPTION OF THE DRAWINGS

FIG. 1 is a schematic representation of apparatus utilized in a process conducted in accordance with one embodiment of the present invention wherein ceramic feed material is fed in batch form through tandemly arranged kilns;

FIG. 2 is a cross-sectional detail view of a portion of the apparatus of FIG. 1 illustrating the formation of a hollow elongate member;

FIG. 3 is a perspective view of one end of a hollow elongate member formed in accordance with the present invention.

FIG. 4 is a cross-sectional view of a portion of the elongate member of FIG. 3, taken on line 4—4 of FIG. 3.

DETAILED DESCRIPTION

Figure 5:
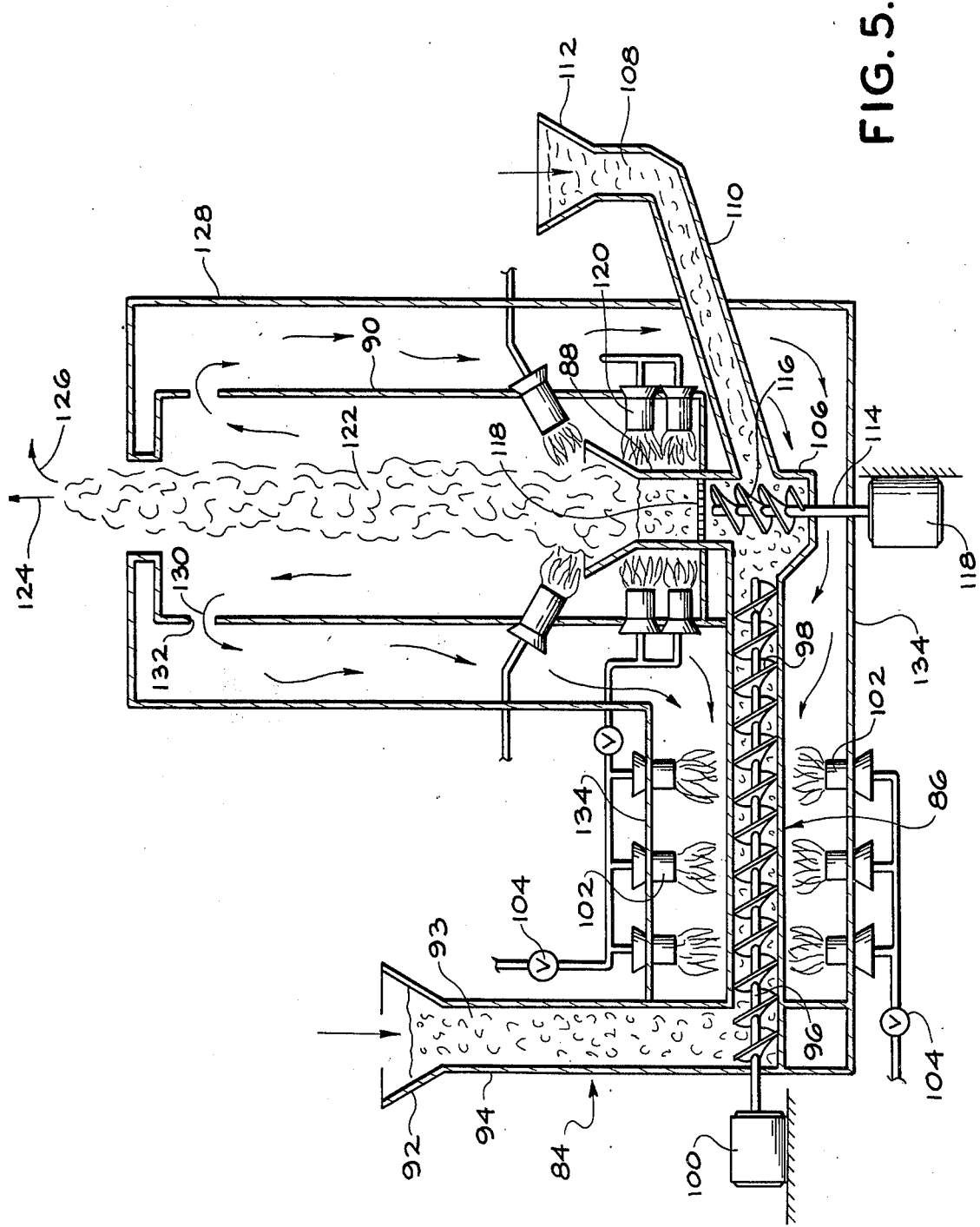
FIG. 5 is a schematic representation of apparatus utilized in a process conducted in accordance with a second embodiment of the present invention.

As required, detailed illustrative embodiments of the invention are disclosed herein. However, it is to be understood that these embodiments merely exemplify the invention which may take forms that are different from the specific illustrative embodiments disclosed. Therefore, specific structural and functional details are not to be interpreted as necessarily limiting, but as basis for the claims which define the scope of the invention.

Referring to FIG. 1, a continuous process is illustrated in which batches 10 of ceramic feed material are transported through a section of a preheat kiln 12. A plurality of flat refractory plates 14, e.g. of asbestos, are linked together by chain 16 and carried over rollers 18 in endless loop fashion through the preheat kiln 12 and through an adjacent, tandemly disposed foaming kiln 20 and from there into and out of a drawing kiln 22, returning back to the preheat kiln 12. Downstream of the preheat kiln 12, there is located a feed hopper 23 containing a release agent 24. The release agent can be carbon black, silicon fluid, or other such material as known to the glass art which will serve to prevent the ceramic feed from sticking to the refractory plates. Movement of the refractory plate past the release agent hopper 23 engages a linkage connected to a valve 26 on the hopper 23 resulting in deposition on the surface of the refractory plate of a quantity of the release agent 24. The refractory plate 14 then travels into the preheat kiln section 12 and past a hopper 28 containing ceramic feed material 30. The feed material 30 travels past baffles 32 and onto the refractory plate 14, also as a result of actuation by movement of the plate against linkage connected to a valve 34 located at the neck of the hopper 28.

The preheat kiln 12 includes a top preheat kiln 36 surrounding the neck of the ceramic feed hopper 28 and which is heated by means of burners 38 therein. Additionally, the preheat kiln 12 includes a bottom preheat kiln section 40, also heated by means of burners 42. The flames of the burners 38 and 42 play upon adjacent metallic wall panels so that the heat supply within the kiln is indirect. Of course, the rollers 18 are formed of refractory ceramic material so as to not be adversely affected by the heat generated by the burners 38 and 42. Appropriate valves 44 are provided for each burner so as to permit control of temperature as desired.

In the embodiment depicted in FIG. 1, the ceramic feed material 30 includes a foaming agent mixed therewith, and which will be described in more detail hereinafter. The temperature generated in the preheat kiln 12 is at least 500° C, but is below the temperature required for activation of the foaming agent. Generally, the preheat temperature is in the range of about 500°-750° C.

The preheated mixture of ceramic feed and foaming agent is transported into the foaming kiln section 20 which is heated by burners 46 to a temperature which is sufficiently high to activate the foaming agent, generally in the range of about 800°-1200° C. Activation of course, is not instantaneous but occurs over several seconds and the apparatus is designed so that as the ceramic feed material foams it it is transported into the drawing kiln section 22. At the drawing kiln section 22 the foamed ceramic 48 is further heated by the open flame of burners such as at 50 and 52, controlled by appropriate valves as at 54. As a result of the natural forces involved in formation of the foamed ceramic 48, it rises within the drawing kiln section 22.

During start-up operation of the process, the initial amount of foamed glass 48 is gathered by insertion into the product of a bait 56, as is known in the glassmaking art. The bait is pulled upwardly, as indicated by the arrow 58, through an opening 60 in the roof 62 of the drawing kiln 22 until it emerges from the opening. After the bait has drawn out an initial length of foamed ceramic product, the gather is thereafter transported by means of rollers or other mechanism (not shown) and the bait is simply broken away. The gather is continuously directed to a forming station to be formed into an elongate foamed ceramic product.

Referring to FIG. 2, details are illustrated of a particular foaming process which can be used in conjunction with the apparatus of FIG. 1. In particular, a top section is shown in detail of the drawing kiln 22, roof 62 and opening therein 60. A pair of refractory, pointed formers 64 and 66 are located within the opening 60 spaced one from the other and centrally below which is disposed the terminal end of a conical, hollow mandrel 68. A stream of air, as indicated at 70, is fed through a conduit 72 through the hollow mandrel 68, exiting from the top thereof as indicated by the arrow 74. The initial gather of foamed glass 48 is directed by the bait around and past the outer surface of the hollow madrel 68 and, as a result of the stream of air 70, forms into a hollow tubular memfber 76. The bait carries the initial product between a pair of rollers 78 and 80 spaced sufficiently distant from the drawing kiln so that the product drawn therebetween at that point is cooled enough to be rigid and substantially nondeformable. The bait is broken away above the rollers 78 and 80, which rollers are then rotated (by means not shown) to continue drawing the tubular product 76 from the drawing kiln 22 at a desired rate.

The rate of drawing is chosen so as to obtain a desired thickness of tube coordinated with the rate of movement of the ceramic feed material through the apparatus. The drawing rate can range from 1 inch per second to 1 inch per ten minutes and the viscosity of the foamed ceramic from the foaming kiln section to the exit of the drawing kiln is in the range of 1 -10;000 poises. The general physical properties of the resultant product will include a density in the range of 15°-90 lbs./ft$^3$, a coefficient of thermal expansion of about 7 to 12 × $10^{-6}$/°C, zero flame spread under ASTM E84 and noncombustibility under ASTM E136.

Referring to FIGS. 3 and 4, the tubular product 76 formed as a result of the process is an elongate continuous member of foamer ceramic. As particularly shown in FIG. 4, the foamed ceramic has a celluar structure of closed elongate bubbles 82 having an elongate configuration and, as a result of the drawing process practiced herein, the majority of the bubbles are in substantial axial alignment. In other words, the longitudinal axis of most of the bubbles are extended in the direction of drawing of the tubular member. With the ceramic feed formulations and conditions hereinafter described, the bubbles have diameters substantially in the range of about 0.01 mm to about 1 cam and lengths substantially in the range of about 2 mm to about 5 cm, the volume of the bubbles constituting about 10% to about 90% of the volume of the elongate member 76.

Immediately following formation of the cellular ceramic tubular product, it is conveyed to an annealing lehr and maintained therein for a time sufficient to relieve strain. The amount of annealing depends, of course, on the composition of the glass mix and thickness of the product. Initially, the product is annealed at about 5° C above its annealing point for a time ranging from about 5 minutes for ⅛ inch thick product to ½ hour for ½ inch product and longer, proportionately, for thicker products. The annealing point soda lime glass is about 545°-555° C; for lead-alkali glass, about 430°-435° C; and for borosilicate glass, about 495°-505° C. The specific annealing point for any particular glass composition can be approximated using tables of known annealing points for various compositions, all as known in the glassmaking art.

Thereafter, the product is cooled to just below its strain point over a period ranging from about 5 minutes to a period which is about two-thirds of the time the product is maintained above its annealing point. The strain point for soda lime glass is about 505°-510° C; for lead-alkali glass, about 390°-395° C; and for borosilicate glass about 455°-520° C. Here too, the specific strain point can be approximated from known composition-strain point tables. Finally, the product is cooled to about 50° C below the strain point over a somewhat shorter period and over a still shorter period to room temperature, all as generally known in the glass-making art.

Referring now to FIG. 5, an alternative embodiment is illustrated which can be referred to as a tank process and which includes a feed section 84, a preheat kiln section 86, a foaming kiln section 88, which can also be referred to as the "tank", and a drawing kiln section 90. In this embodiment, the sections are all connected together and the feed material is continuously moved by means of auger screw feeders. Additionally, the foaming agent is added to the ceramic feed after preheating of the ceramic feed.

Specifically, the feed section includes a hopper 92 into which is fed ceramic feed material 93 which travels down the elongate neck section 94 to the horizontally disposed preheat section 86. Within the preheat section 86 there is located a screw feed 96 with auger flights 98 driven by a motor 100 and pitches so as to drive the ceramic material through the preheat section 86 toward and into the foaming section 88. The preheat kiln section 86 is heated by burners 102, controlled by valves, such as at 104, so that the material within the preheat section is heated to about 500°–750° C.

The terminal end of the preheat kiln section 86 opens into a mixing chamber 106. Foaming agent 108 is delivered into the mixing chamber 106 by means of a chute 110 connected thereto and fed from a hopper 112. A screw feed is located within the mixing chamber 114 and has its auger flights 116 rotated by a motor 118 so as to direct the ceramic feed 93 and foaming agent 107, as a mixture, through a perforated refractory plate 118 (e.g. of asbestos) into the foaming kiln, or tank, section 88. At that section, additional burners 12 heat the mixture past the activation temperature of the foaming agent, to a temperature of 800°–1200° C, causing the mixture to foam whereupon it rises as foamed glass 122 into the drawing kiln 98. As with the process depicted in FIG. 1, initially a bait is lowered into the drawing kiln to gather the foamed glass and it is thereby drawn out of the drawing kiln 90 and directed upwardly as indicated by the arrow 124, or horizontally as indicated by arrow 126, to a product forming station. The product can be formed into a hollow elongate member as depicted in FIGS. 3 and 4 by means of ancillary apparatus as shown in FIG. 2. In the particular embodiment illustrated in FIG. 5, the drawing kiln 90 is surrounded by a shell 128 spaced therefrom. Hot air 130 from the drawing kiln 90 escapes through openings 132 into the space between the shell 128 and the drawing kiln 90, and is directed back to the burner section below and above the preheat kiln section 86 enclosed by horizontal extension walls 134 of the shell 128. The process is made more efficient by such utilization of the hot air returned from the drawing kiln.

In the most general form of the invention, any ceramic feed material can be used which will form a glass composition, including glass itself. Of course, silicates ($SiO_2$) such as is the predominate component of sand, is the major constituent of most commercial glasses and constitutes a fundamental material in the present ceramic feed. Additionally, soda ($Na_2O$) and lime (CaO) can be used as common ingredients as can potash ($K_2O$), lead oxide (PbO), magnesium oxide (MgO), aluminum oxide ($Al_2O_3$), boron trioxide ($B_2O_3$), and the like. Additionally, oxidizing or reducing agents, or decolorizing or coloring agents can be added, as can opacifying or nucleating agents, as well as excess glass from a previous melt such as cullet as generally known in the glass-making art.

In addition to the usual oxides found in ordinary glass, the present invention is found to be particularly suitable for the incorporation of fly ash. Fly ash is usually an iron bearing calcium alumino-silicate generated from coal and is usually considered as waste material. In conducting the powder process as described with respect to FIG. 1, one can add from 1 to 30% fly ash as filler, thus diluting the ceramic with an inexpensive material yet which provides a product having all the desired properties. In conducting the tank process as described with respect to FIG. 5, one can use substantially more fly ash and in fact one prefers to use at least 50 weight percent fly ash and can conduct the process entirely with fly ash. Accordingly, one can use from 50 to 100% fly ash, the remainder, if any, to be constituted of the usual glass forming oxides.

As foaming agents, one can use any material that is usually used in foaming glass. Accordingly, one can use inorganic carbonates such as sodium carbonate, lithium carbonate, potassium carbonate, dolomite, or inorganic sulfate such as sodium sulfate, potassium sulfate and the like or one can simply use carbon such as carbon black or the like. The amount of foaming agent used can be in the range of about 0.5–20% of the weight of the ceramic-forming materials, but lower or higher amounts can be used for specific effects.

The following examples, in which all parts and percentages are by weight, will further illustrate the invention.

EXAMPLE 1

A process can be conducted utilizing the apparatus depicted in FIGS. 1 and 2 to obtain an elongate pole structure of foamed ceramic having the physical characteristics hereinbefore described. As a ceramic feed, one can use a mixture of 2% fly ash and 98.0% other glass-forming oxides. As the other glass-forming oxides one can use a mixture comprising 73.0% $SiO_2$, 13.5% $Na_2O$, 9.0% CaO, 3.0% MgO and 1.5% $Al_2O_3$. As the fly ash one can use Ohio fly ash comprising 52.1% $SiO_2$, 32.0% $Al_2O_3$, 3.3% $Fe_2O_3$ and 12.6% impurities. As foaming agent one can use calcium carbonate, in an amount equal to 10% of the weight of the glass-forming oxides and fly ash, mixed in therewith.

Carbon black can be placed on the refractory plates, as a release agent. The preheat kiln section can be heated so that the ceramic feed material attains a temperature therein of 650° C, with a maximum of 750° C. The foaming kiln section can be heated so that the ceramic feed mixture attains a temperature therein of 950° C. The gather can be drawn at a pull rate of about one-third inches second and with a viscosity at the drawing point of about 5000 poises. A tubular cellular ceramic product can thus be obtained having 50% porosity where the bubbles constituting the pores have an average diameter of 1 mm and an average length of 4 mm. The product has a thickness of one-half inch and is annealed at 553° C for about 60 minutes followed by a reduction in temperature to about 500° C over about 40 minutes, and then to about 450° C over a period of about 25 minutes, to room temperature over about 20 minutes. A product is obtained having the general physical properties as hereinbefore described.

EXAMPLE 2

The process described in Example 1 can be repeated, but using a ceramic feed mixture in which 10.0 weight percent fly ash is mixed with other glass-forming oxides. The other glass-forming oxides can comprise 73.6% $SiO_2$, 16.0% $Na_2O$, 0.6% KaO, 5.2% CaO, 3.6% MgO and 1.0% $Al_2O_3$. As the fly ash one can use material comprising 32.0% $SiO_2$, 20.8% $Al_2O_3$, 34.9% $Fe_2O_3$ and 12.3% impurities. The foaming agent can be sodium carbonate at a level of 5%. The product can be annealed using the schedule in Example 1, but at 515° C, followed by a reduction in temperature to 465° C, then to 415° C and, finally, to room temperature. A product can thus be obtained having the general physical properties as hereinbefore described.

EXAMPLE 3

The process described in Example 1 can be repeated but one can mix 21.0 weight percent fly ash with other glass-forming oxides. As such other glass-forming oxides, one can use a mixture comprising 63.0% $SiO_2$, 7.6% $Na_2O$, 7.0% $K_2O$, 0.3% CaO, 0.3% MgO, 0.2% $B_2O_3$, 0.6% $Al_2O_3$ and 21.0% PbO. As fly ash, one can use material comprising 50.1% $SiO_2$, 33.2% $Al_2O_3$, 10.7% $Fe_2O_3$ and 6.0% impurities. The foaming agent can be potassium sodium sulfate at a level of 18%. The product can be annealed using the schedule in Example 1, but at 440° C, followed by a reduction in temperature to 390° C, then to 340° C, and, finally, to room temperature. A product can thus be obtained having the general physical properties as hereinbefore described.

EXAMPLE 4

A process can be conducted utilizing the apparatus depicted in FIGS. 5 and 2 to obtain an elongate pole structure of foamed ceramic having the physical characteristics hereinbefore described. As a ceramic feed material added to the preheat kiln section, one can use a mixture of 55.0% fly ash and 45.0% of other glass-forming oxides. As the other glass-forming oxides, one can use a mixture comprising 75.0% $SiO_2$, 10.1% $Na_2O$, 1.3% $K_2O$, 7.3% CaO, 4.8% MgO and 1.5% $Al_2O_3$. As the fly ash, one can use Ohio fly ash comprising 40.3% $SiO_2$, 21.5% $Al_2O_3$, 27.5% $Fe_2O_3$ and 10.7% impurities. As foaming agent added separately, following preheat, as above described, one can use calcium carbonate at the rate of 10% of the ceramic feed mixture.

The preheat kiln section can be heated so that the ceramic feed material attains a temperature therein of 700° C with, a maximum of 750° C. The foaming kiln section can be heated so that the mixture of foaming agent and ceramic feed mixture attains a temperature therein of 1000° C. The gather can be drawn at a pull rate of about 1 inch per second and with a viscosity at the drawing point of about 1000 poises. The product has a thickness of one-half inch and can be annealed using the schedule in Example 1. A tubular cellular ceramic product can thus be obtained having 50% porosity wherein the bubbles constituting the pores have an average diameter of 1 mm and an average length of 4 mm, the product having the general physical properties as hereinbefore described.

EXAMPLE 5

The process of Example 4 can be conducted but one can use a ceramic feed mixture containing 75% fly ash. The other glass-forming oxides can be formed from a mixture containing 80.5% $SiO_2$, 4.0% $Na_2O$, 0.4% $K_2O$, 12.9% $B_2O_3$ and 2.2% $Al_2O_3$. The fly ash component can comprise 45.7% $SiO_2$, 29.8% $Al_2O_3$, 17.9% $Fe_2O_3$ and 6.6% impurities. The foaming agent can be lithium carbonate at a level of 2.0%. The product can be annealed following the schedule of Example 1. The tubular cellular product can thus be obtained having the general physical properties hereinbefore described.

EXAMPLE 6

The process of Example 4 can be repeated but using 100% fly ash having the following composition: 44.6% $SiO_2$, 35.4% $Al_2O_3$, 12.4% $Fe_2O_3$ and 7.6% impurities. The foaming agent can be dolomite at a level of 15%. The product can be annealed following the schedule of Example 1. A tubular cellular product is thus obtainable having the general physical properties hereinbefore described.

We claim:
1. A continuous, moldless process for the manufacture of cellular ceramic product in which a foaming agent is added to a ceramic feed, said foaming agent requiring a temperature in excess of 500° C for activation, comprising:
transporting a first amount of said ceramic feed through a first kiln section and heating said first feed amount in said first kiln section to a first temperature of at least 500° C but which is lower than said activation temperature;
transporting said heated first feed amount into a second kiln section while transporting a second amount of said ceramic feed through said first kiln section and heating said second feed amount to said first temperature;
adding foaming agent to said heated first feed amount after passage of said first feed amount through said first kiln section to form a mixture thereof;
heating said mixture of foaming agent and said heated first feed amount to said activation temperature in said second kiln section for a time sufficient to form a first amount of foamed ceramic;
transporting said first amount of foamed ceramic while it is at or above its softening point to a drawing kiln section while transporting said heated second feed amount into said second kiln section;
adding foaming agent to said heated second feed amount after passage of said second feed amount through said first kiln section to form a mixture thereof;
heating said mixture of foaming agent and said heated second feed amount to said activation temperature in said second kiln section for a time sufficient to form a second amount of foamed ceramic; and
transporting said second amount of foamed ceramic while it is at or above its softening point to said drawing kiln section and forming said product from said first and second amounts of foamed ceramic.
2. The process of claim 1 wherein said foaming agent is added to said ceramic feed in each case at said second kiln section.
3. The process of claim 1 wherein said ceramic feed comprises a major amount by weight of fly ash.
4. The process of claim 1 in which said product is formed as an elongate member having a length of at least 10 feet and a width dimension in the range of about 3–36 inches.
5. The process of claim 4 in which said elongate member is formed in hollow tubular form.

6. The process of claim 1 in which said product is formed by drawing said foamed ceramic, while soft, around and past a hollow mandrel while air is passed through said mandrel.

7. The process of claim 1 in which said first temperature is in the range of about 500° to 750° C and said activation temperature is in the range of about 800°-1200° C.

8. Apparatus for the continuous, moldless manufacture of cellular ceramic product in which a foaming agent is added to a ceramic feed, said foaming agent requiring a temperature in excess of 500° C for activation, comprising:
   first and second tandemly disposed kiln sections in communication one with the other;
   means for heating said ceramic feed in said first kiln section to a first temperature of at least 500° C but which is lower than said activation temperature;
   transport means for continuously conveying ceramic feed through said first kiln section and into said second kiln section;
   means for adding foaming agent to said ceramic feed after passage through said first kiln section to form a mixture thereof;
   means for heating said mixture of foaming agent and said heated ceramic feed in said second kiln section to a temperature and for a time sufficient to activate said foaming agent and form foamed ceramic therefrom;
   a drawing kiln section;
   means for transporting said foamed ceramic while at or above the softening point thereof to said drawing kiln section and forming said product from said foamed ceramic.

9. The apparatus of claim 8 including means for adding said foaming agent to said ceramic feed at said second kiln section.

10. The apparatus of claim 8 including means for drawing said foamed ceramic while soft to an elongate shape.

11. The apparatus of claim 8 including means for forming said product into a hollow elongate member having a length of at least 10 feet and a width dimension in the range of about 3-36 inches.

12. The apparatus of claim 11 in which said forming means comprises a hollow mandrel, means for passing air through said mandrel, and means for drawing said foamed ceramic, while soft, around and past said mandrel while said air is being passed through said mandrel.

* * * * *

UNITED STATES PATENT AND TRADEMARK OFFICE
CERTIFICATE OF CORRECTION

PATENT NO. : 4,038,063
DATED : July 26, 1977
INVENTOR(S) : Tudor Williams and John D. Bost It is certified that error appears in the above-identified patent and that said Letters Patent are hereby corrected as shown below:

Col. 1, line 19, insert --for example-- after "conduit".

Col. 4, line 6, "madrel" should be --mandrel--.

Col. 4, line 8, "memfber" should be --member--.

Col. 4, line 23, "1-10;000 poises" should be --1 poise - 10,000 poises--.

Col. 4, line 31, "foamer" should be --foamed--.

Col. 4, line 41, "cam" should be --cm--.

Col. 5, line 21, "pitches" should be --pitched--.

Col. 5, line 36, "12" should be --120--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*